United States Patent
Elizarov et al.

(10) Patent No.: US 8,658,112 B2
(45) Date of Patent: *Feb. 25, 2014

(54) MICROFLUIDIC CHIP CAPABLE OF SYNTHESIZING RADIOACTIVELY LABELED MOLECULES ON A SCALE SUITABLE FOR HUMAN IMAGING WITH POSITRON EMISSION TOMOGRAPHY

(75) Inventors: Arkadij M. Elizarov, Woodland Hills, CA (US); Hartmuth C. Kolb, Playa Del Rey, CA (US); R. Michael Van Dam, Los Angeles, CA (US); James R. Heath, South Pasadena, CA (US)

(73) Assignees: Siemens Medical Solutions USA, Inc., Malvern, PA (US); California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,418

(22) Filed: Nov. 1, 2011

(65) Prior Publication Data

US 2012/0101268 A1    Apr. 26, 2012

Related U.S. Application Data

(63) Continuation of application No. 11/540,344, filed on Sep. 29, 2006, now Pat. No. 8,075,851.

(60) Provisional application No. 60/721,607, filed on Sep. 29, 2005.

(51) Int. Cl.
G01N 33/00    (2006.01)

(52) U.S. Cl.
USPC ........ 422/502; 422/68.1; 422/82.02; 422/500

(58) Field of Classification Search
USPC ............... 422/502, 504, 500, 68.1, 82.02
See application file for complete search history.

(56) References Cited

U.S. PATENT DOCUMENTS

| 2,716,017 | A | 8/1955 | Linker |
| 3,613,729 | A | 10/1971 | Dora |
| 4,536,121 | A | 8/1985 | Stewart et al. |
| 4,696,195 | A | 9/1987 | Savonlahti et al. |

(Continued)

FOREIGN PATENT DOCUMENTS

| WO | 9322058 | 11/1993 |
| WO | 9511080 | 4/1995 |

(Continued)

OTHER PUBLICATIONS

Dharmatilleke, S., et al. "Three-dimensional silicone microfluidic interconnection scheme using sacrificial wax filaments", Proceedings of SPIE, vol. 4177, pp. 83-90, Aug. 28, 2006.

(Continued)

Primary Examiner — Sam P Siefke
(74) Attorney, Agent, or Firm — Joshua B Ryan

(57) ABSTRACT

Described herein are automated, integrated microfluidic device comprising a chemical reaction chip comprising for performing chemical reaction, a microscale column integrated with the chip and configured for liquid flow from the column to at least one flow channel, and wherein the fluid flow into the column is controlled by on-chip valves; and comprising at least two on-chip valves for controlling fluid flow in the microfluidic device.

18 Claims, 4 Drawing Sheets

(56) References Cited

U.S. PATENT DOCUMENTS

| | | | |
|---|---|---|---|
| 4,721,133 | A | 1/1988 | Sundblom |
| 4,924,241 | A | 5/1990 | Parks et al. |
| 4,977,948 | A | 12/1990 | Chandley |
| 5,413,227 | A | 5/1995 | Diebold et al. |
| 5,624,556 | A | 4/1997 | Kutowy |
| 5,679,580 | A | 10/1997 | Ball et al. |
| 5,765,591 | A | 6/1998 | Wasson et al. |
| 5,863,502 | A | 1/1999 | Southgate et al. |
| 5,988,603 | A | 11/1999 | McCampbell et al. |
| 5,989,402 | A | 11/1999 | Chow et al. |
| 6,065,195 | A | 5/2000 | Chatterjee et al. |
| 6,145,810 | A | 11/2000 | Connolly et al. |
| 6,399,025 | B1 | 6/2002 | Chow |
| 6,416,642 | B1 | 7/2002 | Alajoki et al. |
| 6,431,976 | B1 | 8/2002 | Auquier |
| 6,720,710 | B1 | 4/2004 | Wenzel et al. |
| 6,752,371 | B2 | 6/2004 | Herbert et al. |
| 6,814,337 | B2 | 11/2004 | Schmaltz |
| 6,830,545 | B2 | 12/2004 | Bendall |
| 6,830,729 | B1 | 12/2004 | Holl et al. |
| 6,929,030 | B2 | 8/2005 | Unger et al. |
| 7,040,338 | B2 | 5/2006 | Unger et al. |
| 7,144,568 | B2 | 12/2006 | Ricard et al. |
| 7,223,363 | B2 | 5/2007 | McNeely et al. |
| 2001/0012612 | A1 | 8/2001 | Petersen |
| 2002/0010381 | A1 | 1/2002 | Soundararajan |
| 2002/0048536 | A1* | 4/2002 | Bergh et al. ............... 422/130 |
| 2002/1666585 | | 11/2002 | O'Connor et al. |
| 2003/0019833 | A1 | 1/2003 | Unger et al. |
| 2003/0175947 | A1 | 9/2003 | Liu et al. |
| 2003/0214057 | A1 | 11/2003 | Haung |
| 2004/0022696 | A1 | 2/2004 | Zigler et al. |
| 2004/0037739 | A1 | 2/2004 | McNeely et al. |
| 2004/0101444 | A1 | 5/2004 | Sommers et al. |
| 2004/0242953 | A1 | 12/2004 | Good |
| 2005/0265906 | A1 | 12/2005 | Najafi |
| 2006/0078475 | A1 | 4/2006 | Tai et al. |
| 2006/0150385 | A1 | 7/2006 | Gilligan et al. |
| 2006/0163069 | A1 | 7/2006 | Prak et al. |
| 2007/0012891 | A1 | 1/2007 | Maltezos |
| 2007/0051412 | A1 | 3/2007 | Heath et al. |
| 2007/0272309 | A1 | 11/2007 | Rehm et al. |
| 2008/0224072 | A1 | 9/2008 | Sonnenhol et al. |

FOREIGN PATENT DOCUMENTS

| | | |
|---|---|---|
| WO | 0043766 | 7/2000 |
| WO | 0073412 | 12/2000 |
| WO | 0141931 | 6/2001 |
| WO | 0173417 | 10/2001 |
| WO | 0240874 | 5/2002 |
| WO | 02070932 | 9/2002 |
| WO | 02072264 | 9/2002 |
| WO | 03008308 | 1/2003 |
| WO | 03024597 | 3/2003 |
| WO | 03049860 | 6/2003 |
| WO | 03078358 | 9/2003 |
| WO | 03087410 | 10/2003 |
| WO | 03098219 | 11/2003 |
| WO | 2004093652 | 11/2004 |
| WO | 2006060748 | 6/2006 |
| WO | 2006071470 | 7/2006 |
| WO | 2006098817 | 9/2006 |
| WO | 2006116629 | 11/2006 |
| WO | 2007027928 | 3/2007 |
| WO | 2007041486 | 4/2007 |
| WO | 2007092472 | 8/2007 |

OTHER PUBLICATIONS

Unger, M.A., et al., "Monolithic Microfabricated Valves and Pumps by Multilayer Soft Lithography", Science, vol. 288, No. 5463, pp. 113-116 (Apr. 2000).
Thorsen, T., et al., "Microfluidic Large-Scale Integration", Science, vol. 298, No. 5593, pp. 580-584 (Sep. 2002).
Rolland, J.P., et al., "Solven-Resistant Photocurable 'Liquid Teflon' For Microfluidic Device Fabrication", JACS, vol. 126, pp. 2322-2323 (2004).
Van Dam, R.M., "Solvent-Resistant Elastomeric Microfluidic Devices and Applications", PhD Thesis, California Institute of Technology (Aug. 2005).
Studer, V., et al., "Scaling Properties of a Low-Actuation Pressure Microfluidc Valve", Journal of Applied Physics, 95 (1), pp. 393-398 (2004).
Fredrickson, C.K., et al., "Macro-to-Macro Interfaces for Microfluidic Devices", Lab on a Chip, 4, pp. 526-533 (20004).
Gu, W., "Computerized Microfluidic Cell Culture Using Elastomeric Channels and Braille Displays", PNAS, vol. 101, No. 45, pp. 15861-15866 (2004).
Lai, S. M., et al. "Knoevenagel condensation reaction in a membrane microreactor" Chem. Commun, 2003, 218-219.
Yamamoto, T. et al., "PDMS-glass hybrid microreactor array with embedded temperature control device. Application to cell-free protein synthesis", Lab Chip, 2002, 2, 197-202.
Psaltis, D. et al. "Developing optofluidic technology through the fusion of microfluidics and optics", Nature, 2005, 442, 381-386.
Grover, W., H. et al., "Monolithic membrane valves and diaphragm pumps for practical large-scale integration into glass microfluidic devices" Sensors and Actuators E, 2003, 89, 315-323.
Lee, C. C. et al., "Miltistep Synthesis of a Radiolabeled Imaging Probe Using Integrated Microfluics", Science, 2005, 310, 1793-1979.
Gillies, J. M. et al., "Microfluidic reactor for the radiosynthesis of PET radiotracers", J. Appl. Rad. Isot. 2005, 64, 325-332.
Yuen, P.K. et al., "Semi-disposable microvalves for use iwth microfabricated devices or microchips", J. Micromech. Microeng. 2000, 10, 401-409.
Lee, C. et al., "Multistep Synthesis of a Radiolabeled Imaging Probe Using Integrated Microfluidics", www.sciencemag.org, Science, vol. 310, Dec. 16, 2005, pp. 1793-1796.
Japanese Office action in JP application No. 2008-533747, dated Apr. 24, 2012 (English translation attached).

* cited by examiner

MICROFLUIDIC CHIP CAPABLE OF SYNTHESIZING RADIOACTIVELY LABELED MOLECULES ON A SCALE SUITABLE FOR HUMAN IMAGING WITH POSITRON EMISSION TOMOGRAPHY

CONTINUATION DATA

This application is a Continuation Application of U.S. Ser. No. 11/540,344, filed on Sep. 29, 2006, now U.S. Pat. No. 8,075,851, which claims the benefit of U.S. Provisional Application 60/721,607 filed on Sep. 29, 2005. The entirety all of which are hereby incorporated by reference herein.

FIELD OF THE INVENTION

The present inventions relate to microfluidic devices and related technologies, and chemical processes using the devices. More specifically, the application also discloses the synthesis of radioactive compounds for imaging, such as by PET, in a fast, efficient and compact manner.

BACKGROUND OF THE INVENTION

Large-scale synthesis modules have been developed and used for the preparation of a number of radiopharmaceutical compounds, including 2-deoxy-2-[F-18]-fluoro-D-glucose (FDG) and 3'-deoxy-3'-[F-18]-fluorothymidine (FLT). Such modules or reactors occupy a large amount of space and the chemical process requires longer reaction time cycles than desired for the preparation of the labeled compounds. These modules and reactors are also difficult to modify for the research and development of new compounds and probes. But their main drawback is that the reactions take place with reduced efficiency arising from tremendous dilution of reagents necessary only for macroscopic liquid handling.

An earlier microfluidic chip has been developed by Tseng, et al. from the Department of Molecular and Medical Pharmacology, UCLA. This microfluidic chip is capable of producing [F-18]FDG on a 58 microcurie (μCi) scale. However, the design and configuration of this microfluidic chip have certain limitations, and the chip does not permit the preparation of the labeled product on a significantly larger scale.

The synthesis of the [F-18]-labeled molecular probe, 2-deoxy-2-[F-18]-fluoro-D-glucose (FDG) is based on three major sequential synthetic processes: (i) Concentration of the dilute [F-18]fluoride solution (1-10 ppm) that is obtained from the bombardment of [O-18] water in a cyclotron; (ii) [F-18]fluoride substitution of the mannose triflate precursor; and (iii) acidic hydrolysis of the fluorinated intermediate. Presently, FDG is produced on a routine basis in a processing time (or cycle time) of about 50 minutes using expensive (e.g., >$100K) macroscopic commercial synthesizers. These synthesizers consist, in part, of an HPLC pump, mechanical valves, glass-based reaction chambers and ion-exchange columns. The physical size of these units is approximately 80 cm×40 cm×60 cm.

Inevitably, a considerable decrease in the radiochemical yields of the resulting probe are obtained from these commercial synthesizers because of the long processing times, low reagent concentrations and the short half-life of [F-18]fluorine (t1/2=109.7 min). Moreover, because the commercialized automation system is constructed for macroscopic synthesis, the process requires the consumption of large amount of valuable reagents (e.g. mannose triflate), which is inefficient and wasteful for performing research at the smaller scale. For example, the required radioactivity for FDG PET imaging of a single patient is about 20 mCi, which corresponds to about 240 ng of FDG. However, for small animal imaging applications, such as for a mouse, only about 200 μCi or less of FDG is required.

Accordingly, there is a need to develop smaller or miniaturized systems and devices that are capable of processing such small quantities of molecular probes. In addition, there is a need for such systems that are capable of expediting chemical processing to reduce the overall processing or cycle times, simplifying the chemical processing procedures, and at the same time, provide the flexibility to produce a wide range of probes, biomarkers and labeled drugs or drug analogs, inexpensively. These miniaturized devices may employ polymers, such as PDMS-like elastomers that are inert under the reaction conditions.

Commercial large-scale synthesizers (e.g. Explora and CPCU) are capable of preparing up to 50 doses in a lab-sized operation. On a smaller scale, a microfluidic chip has been disclosed by Tseng, et. al. at the University of California, Los Angeles. The microfluidic chip has been demonstrated to produce 58 microcuries of FDG in a single run. However, the design of this microfluidic chip is such that it is not capable of scaling up by over a 1500 fold that is required to achieve a desired 100 mCi level of activity. In addition, the particular design of the reaction process does not permit a significant increase in the output or the yield.

In addition to the inability to scale up the UCLA microfluidic chip, the inherent design of the chip also limits the loading of reagent activity thereby limiting the reaction throughput. That is, the microfluidic chip requires over 1 hour to load a minimal (500 microcuries) activity onto the exchange resin, which is an unacceptable period of processing time given the short half-life of F-18.

As disclosed in the present application, the design of the microfluidic device overcome this throughput limitation in addition to a number of other advantages. In particular, the device is capable of producing the desired amount of radioactivity in a short (5 minutes) period of time, and the design of the device does not have internal factors limiting either parameters.

SUMMARY OF THE INVENTION

Elastomeric and nonelastomeric microfluidic devices including their various operational components, and their method of fabrication are known in the art. The references cited herein provide a representative number of literature references disclosing certain examples of such devices and their methods of use. All references cited herein are incorporated by references in their entirety.

In one embodiment, the microfluidic devices disclosed in the present application allow the efficient processing of chemical reactions in a microscale. In one particular aspect, the microfluidic devices allow the synthesis of F-18-labeled molecules for PET imaging in an efficient and compact manner, and also allow the process to be performed in a short period of time. The microfluidic devices are designed as a universal devices; that is, they are readily modifiable devices suitable for the preparation of many known molecular probes as well as development of new probes.

Currently it takes a significant effort to synthesize commercial PET probes, such as [F-18]FDG, in macroscopic synthesizers. In addition, using these synthesizers, the development of new probes is limited. Furthermore, the short half-life of F-18 requires the development of any new synthetic processes to be relatively fast and efficient; that is, with relatively short overall processing cycles and high yields.

As disclosed herein, the microfluidic device or chip of the present application is capable of processing and labeling substrates within 5 minutes on a scale leading to several human doses (100 mCi). This scale constitute over 1000 times difference in output compared with the prior chip known in the art. The microfluidic device is also faster and more efficient than any known macroscale synthesizers.

In addition, the microfluidic devices disclosed herein are also readily modifiable, the flexibility of which is required for the development and synthesis of new molecular probes.

Microfluidic devices and their method of fabrication are well know in the art. Examples of such references include "Disposable Microfluidic Devices: Fabrication, Function, and Application" Fiorini and Chiu, *Biotechniques*, 38:429-46, 2005; "Plasma Etched Polymer Microelectrochemical Systems" Beebe et al., *Lab Chip* 2:145-150; and "Monolitic Microfabricated valves and Pumps by Multilayer Soft Lithography" Unger et al., *Science* 288:113-116, 2000.

A number of synthesizers known in the art employ pressure actuated elastomeric valves or pneumatic valves. In addition, there is significant literature disclosing the control of microfluidic valves by various methods of actuation. See for example, US 20020127736. However, under standard reaction processing conditions, the pneumatic valves are pushed to the limit of operation by the internal vapor pressures that are generated during various processing steps, such as a solvent evaporation steps. In one particular embodiment, the microfluidic device disclosed in the present application employs pneumatic valves that are capable of operating efficiently under high pressures. The design of the microfluidic device disclosed herein accomplishes these and other objectives as disclosed herein.

In another embodiment, the microfluidic device is based on a platform or system that is useful for synthesizing radiolabeled compounds for imaging applications, and such applications include the use of PET and SPECT imaging probes. In one particular aspect, the platform or system comprising the microfluidic device is fully automated and computer-controlled. In another aspect, the microfluidic device is relatively compact and measures 20×20×4 mm in size. In another variation, the device measure 25×25×5 mm in size. In certain variations, the microfluidic devices of the present application measure in the range from 7×7×3 mm to 30×30×6 mm or larger.

In one particular embodiment, the microfluidic device comprises an integrated chemical reaction circuit (CRC or "chip"). The CRC of the present application provides a number of new and useful features that overcome the limitations that are associated with the current microfluidic chips. In certain embodiments, the chip comprises a novel reaction chamber (or reactor) design. In one aspect, the chip comprises a mixer for effectively mixing reagents and solvents in the reaction chamber.

In another embodiment, the microfluidic chip is designed to integrate various components, such as evaporators and purification resins and the like, however, the components are configured in new combinations. As a result of the new designs and the new combination of components, the microfluidic chip is capable of producing 1000 times more 18F-labeled products than previously reported. In addition, as disclosed herein, the microfluidic chip is capable of synthesizing at least 6 doses of a labeled compound, such as FDG, with a single 5-minute run.

DEFINITION

Figure 1:
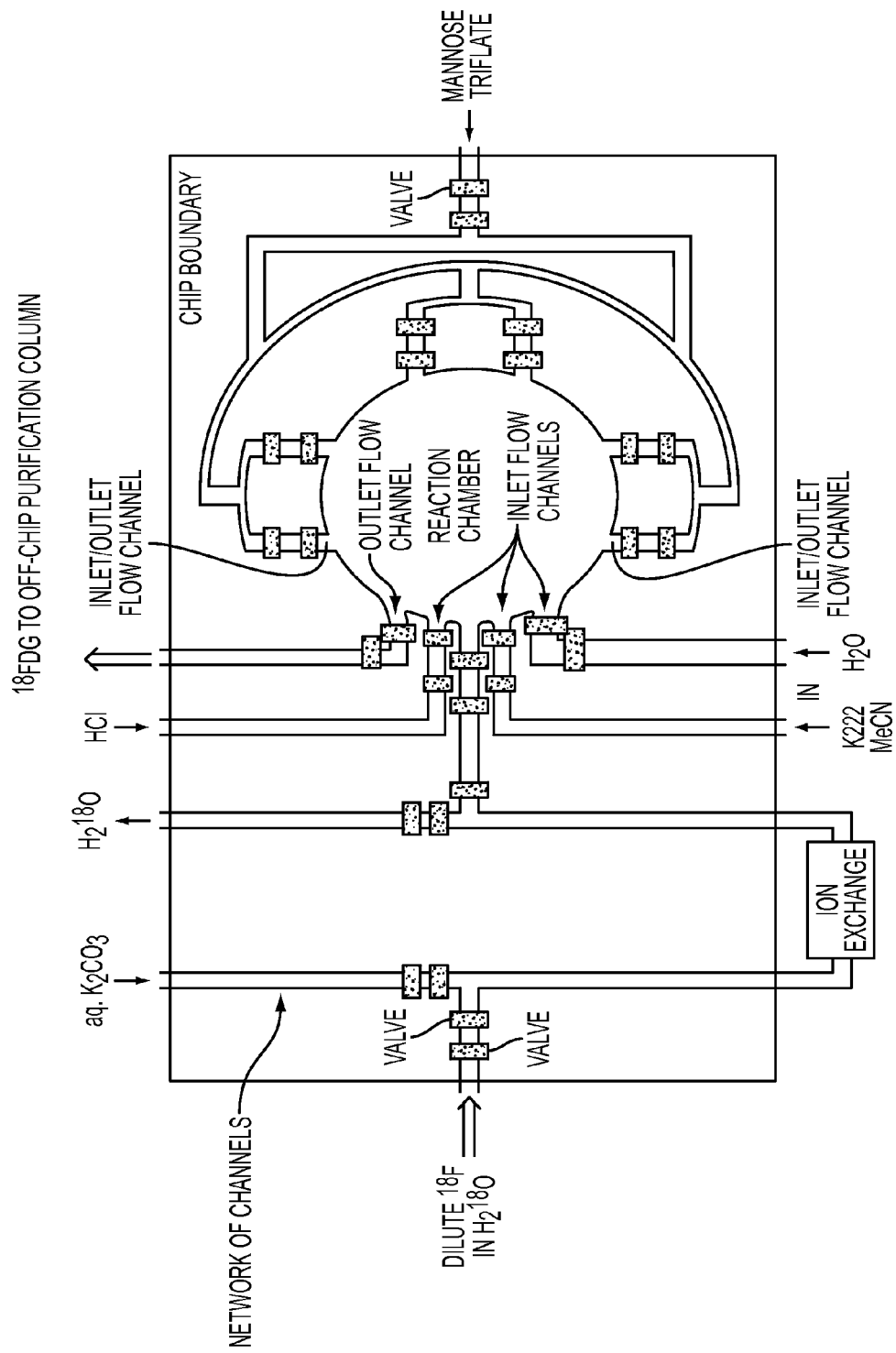
FIG. 1 illustrates an embodiment which incorporates features of the microfluidic device showing the coin-shaped reaction chamber illustrating a chip boundary, the microfluidic device comprising a number of double valves, an ion exchange column and illustrating one embodiment showing the flow of reagents, solvents, starting materials and products.

As used herein, a microfluidic device is a unit or device that permits the manipulation and transfer of microliters or nanoliters of liquid into a substrate comprising micro channels. The device is configured to allow the manipulation of liquids, including reagents, solvents and substrates to be transferred or flow within the micro channels and reaction chamber using mechanical or non-mechanical pumps. The device may be constructed using micro electromechanical fabrication methods as known in the art. Examples of such substrates for forming the device include glass, quartz or polymer. Such polymers may include PMMA (polymethylmethacrylate), PC (polycarbonate), PDMS (polydimethylsiloxane) and the like. Such device may comprise columns, pumps, mixers, valves and the like.

A "Chemical Reaction Circuit" or "CRC" means a chip comprising a reaction chamber or microfluidic reactor, flow channels and valves, and may be configured with a mixer for mixing solutions.

A "column" means a device that may be used to separate, purify or concentrate reactants or products. Such columns are well known in the art, and include ion exchange columns for chromatography.

As used herein, a "coin-shaped" reactor is a reaction cylinder with a height diameter to height with a ratio of greater than about 3, greater than about 5, greater than about 10 or more. The reactor height may be about 25 micrometer to about 1,000 micrometers. The reactor may have a diameter from about 1,000 to about 20,000 micrometers.

"FDG" is 2-deoxy-2-[F-18]fluoro-D-glucose.

A "flow channel" or "channel" means a microfluidic channel through which a fluid or solution may flow through. As is known in the art, such channels may have a cross section of less than about 1 mm, less than about 0.5 mm, less than about 0.3 mm, or less than about 0.1 mm. The flow channels of the present application may also have a cross section dimension in the range of about 0.05 microns to about 1,000 microns, or 0.5 microns to about 500 microns, or about 10 microns to about 300 microns. The particular shape and size of the flow channels will depend on the particular application required for the reaction process, including the desire throughput, and may be configured and sized according to the desired application.

"Target water" is $H_2[18O]$ after bombardment with high-energy protons in a particle accelerator, such as a cyclotron. It contains H[18F].

"FTAG" is 2-deoxy-2-fluoro-1,3,4,6-tetra-O-acetyl-beta-D-glucose.

A microfluidic "valve" as used herein, means a device that may be controlled or actuated to control or regulate fluid or solution flow among various components of the microfluidic device, including flow between flow channels, solvent or reagent resevoirs, reactor or reaction chamber, columns, manifold, temperature controlling elements and devices, and the like. Such valves are known in the art and include, for example, mechanical (or micromechanical valves), (pressure activated) elastomeric valves, pneumatic valves, solid-state valves, etc . . . . Examples of such valves and their method of fabrication may be found, for example, in "The New Generation of Microvalves" *Analytical Chemistry*, Felton, 429-432 (2003). Double valves, as used herein, means that two valves are configured consecutively and in close proximity to each other (approximately 300 microns), and the valves are configured to be "back-up" valves. In certain variation of the device, the double valves may be configured and placed at a distance of about 250 microns or more apart.

DETAILED DESCRIPTION OF THE INVENTION

Compared to known or commercial microfluidic chips, the microfluidic device of the present application comprises of a number of novel elements and components, and their various combinations. Certain elements and components and non-limiting design configuration of the microfluidic device is illustrated below:

1) Ion Exchange Column: The current, known FDG chip design presents a number of scale-up challenges. For example, the currently available FDG chip contains an on-chip ion exchange column that is capable to trapping several orders of magnitude less activity than required for certain applications; that is, about 60 microCi as compared to a target of 300 milliCi. It is unlikely that this scaling issue can be resolved with an on-chip nanoscale columns, since it would require as many as 5,000 parallel columns to trap sufficient amounts of fluoride to meet the desired activity.

In addition, the processing throughput of the known microfluidic chips is also limited. Currently, in a single reaction processing cycle, it takes up to 1 hour to capture 50 µCi of activity on the known microfluidic chip. Consequently, in the microfluidic chip of the present application, a microscale (as opposed to nanoscale) sized column is employed to capture and supply the desired quantity of fluoride ion to overcome the throughput limitations. In one particular embodiment, the column is integrated into the microfluidic chip. In a preferred embodiment, the column is configured and placed off-chip. In certain variations of the embodiment, the column is configured to be mounted on a carrier module.

The off-chip design with certain novel elements for the column and the microfluidic chip provides the following advantages:

(a) The channels that supply the target water into the ion exchange column is designed to be wider than the other channels, resulting in much faster loading rates.

(b) The column capacity can be drastically increased, since the resin can be packaged much more tightly than by collecting the beads by filtration.

(c) A modular (and less expensive) cartridge design may be employed, wherein a pre-packed ion exchange cartridge may be configured and mounted directly on the carrier module.

(d) The off-chip design facilitates the evaluation and use of more resins, since the column will not be limited to a 15 micron bead size.

(e) Sieve valves employed by on-chip columns have the most negative effect on the flow rate through the column since they occlude over 75% of the flow channel cross-section. The off-chip column does not face this occlusion problem.

A representative column with the following parameters has been developed, produced and tested:

Exchange resin—AG-1 X8 (200-400 mesh)—Column volume—2.2 µL.

Dead volume left for the solvent <1 µL.

Loading up to 800 mCi of $^{18}$F-(99.5% trapping efficiency) from 1.8 mL of target water.

Release efficiency—92.7% with 20 µL of 0.05M $K_2CO_3$.

2) Large-Scale Reactor Chip Design Features: Due to the increased volume of the ion exchange column, which necessitates low-µL volumes for [F-18] ion elution, a larger reaction chamber is required compared to the nanoliter-sized reaction loop of previous designs. In addition, the volume of the chamber needs to be equal to the elution volume, which does not permit the use of loop or serpentine designs.

As shown in FIG. 1, a reaction chamber in a shape of a wide and short cylinder; that is, a coin-shaped reaction chamber may be employed. Such a reaction chamber may be 250 µm in height and 5 to 7 mm in diameters, for example; and may be configured in different sizes as desired for different target volumes and throughput.

Figure 2:
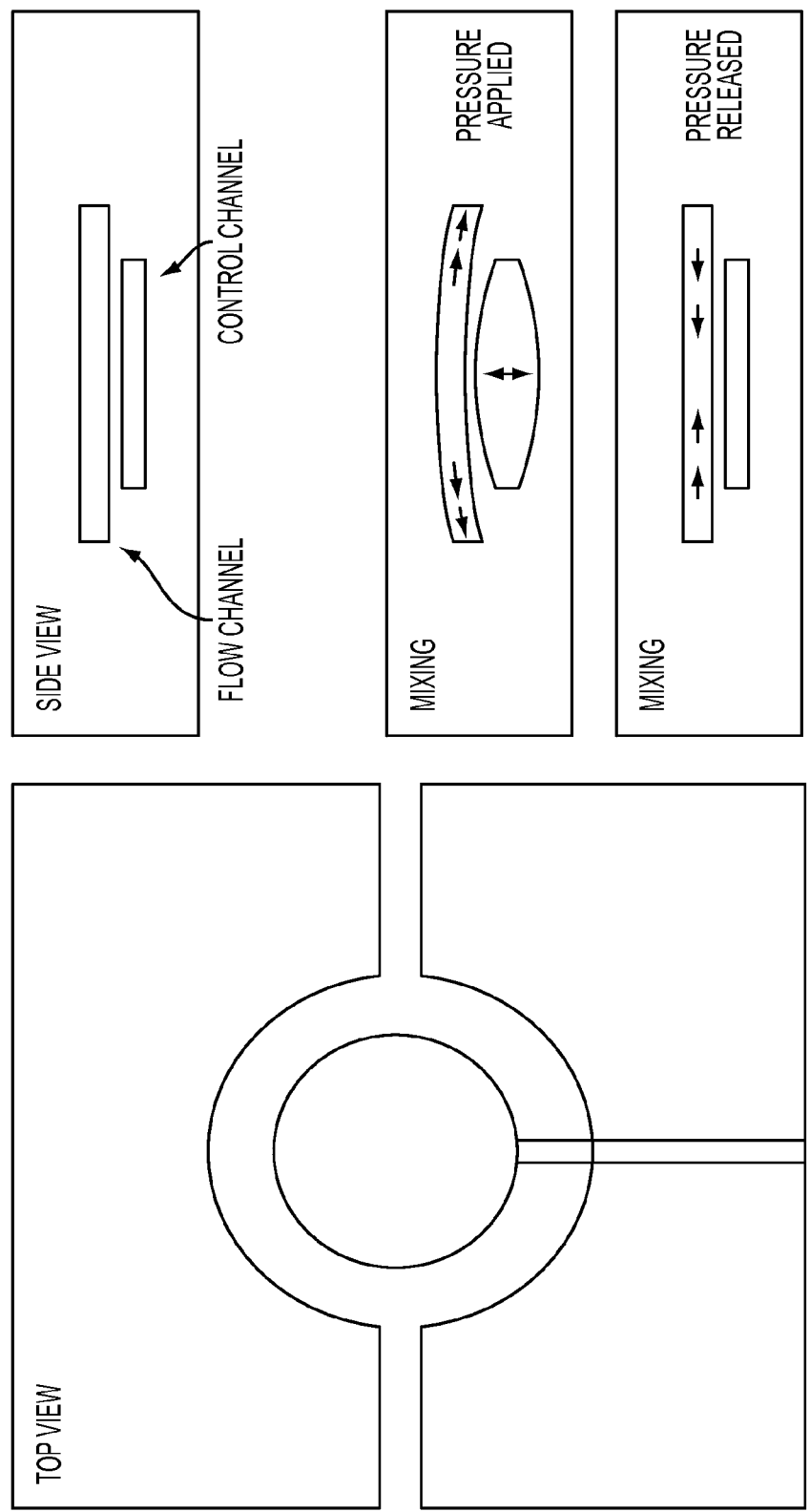
FIG. 2 illustrates an embodiment which incorporates features of the microfluidic device showing the coin-shaped reaction chamber illustrating one embodiment of an active mixing design of the coin-shaped reaction chamber, showing a process of actuating a large flat round dead end channel below the reaction chamber to control flow in the flow channel.
Figure 3:
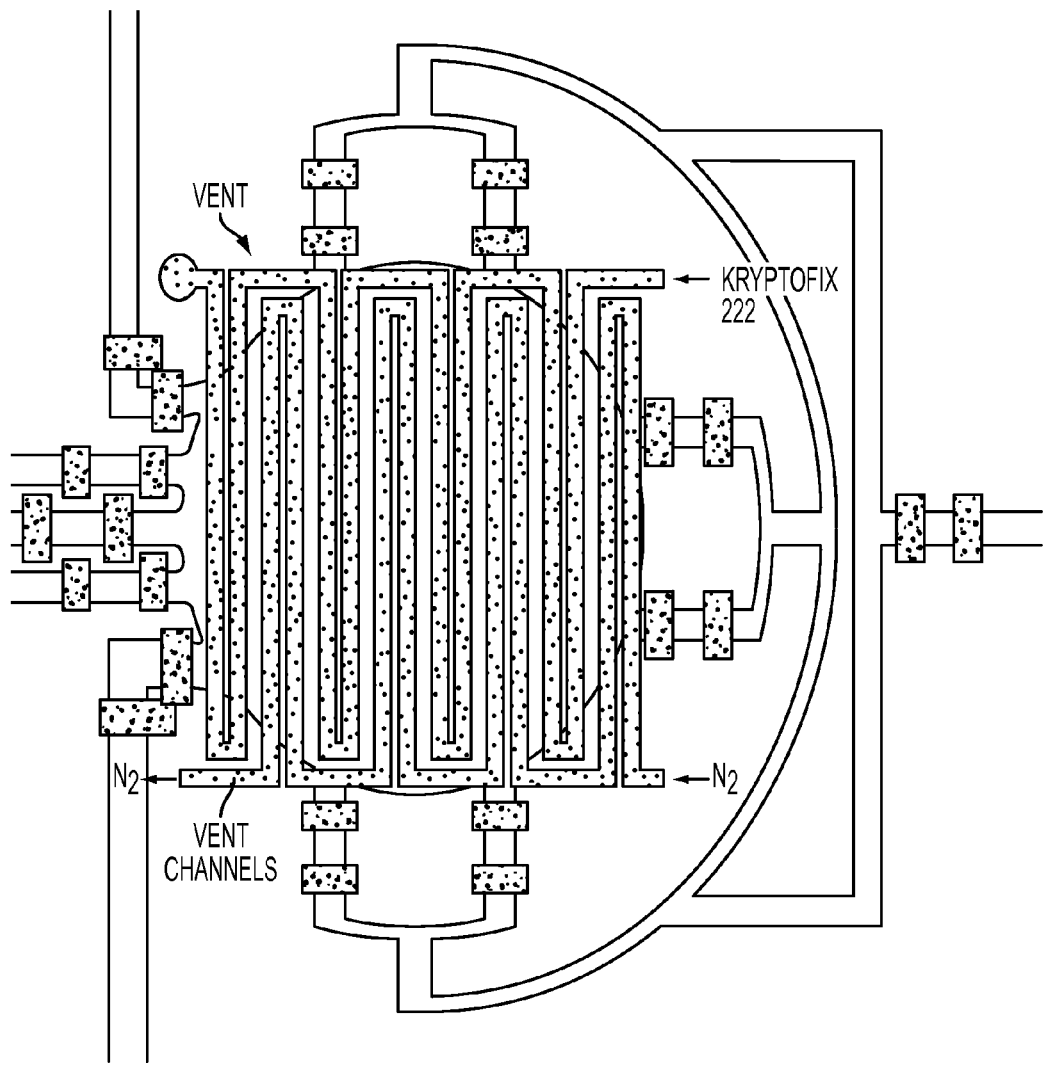
FIG. 3 illustrates an embodiment which incorporates features of the microfluidic device showing the coin-shaped reaction chamber illustrating a double radiator system, showing a radiator mixer integrated with radiator evaporator.
Figure 4:
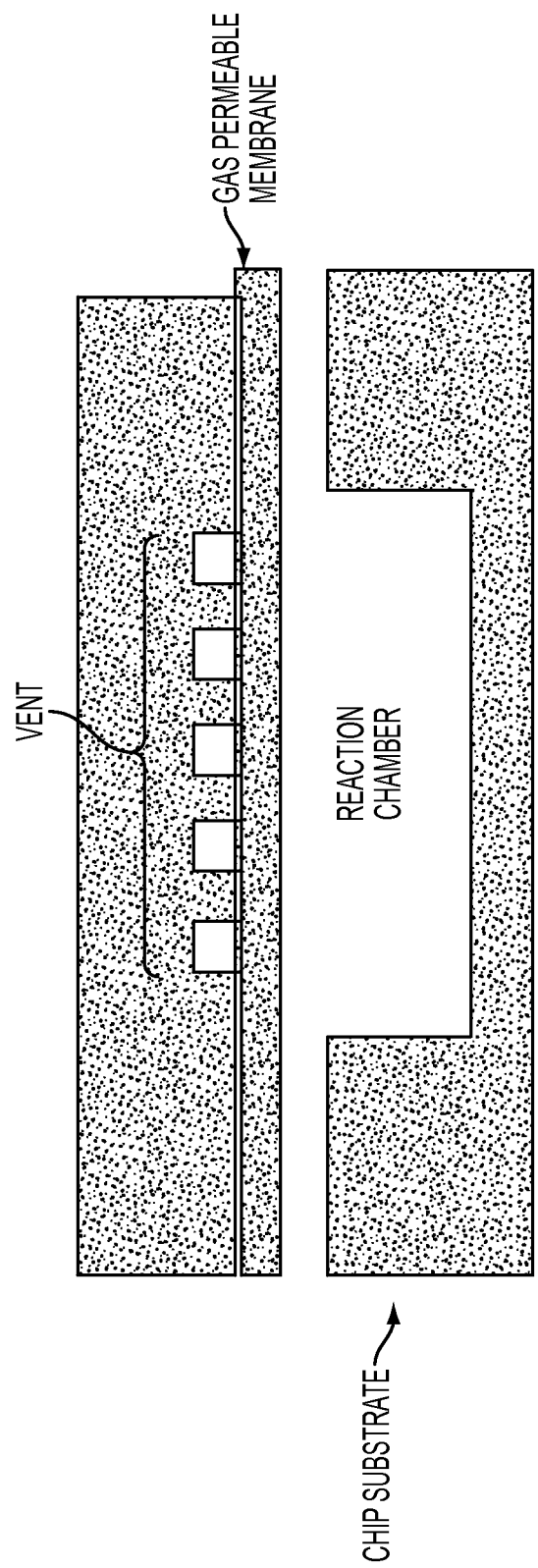
FIG. 4 shows cut-away view of the chip substrate and reaction chamber according to an embodiment of the present invention.

The mixing of the reagents and solutions in the reaction chamber of the microfluidic device may be accomplished using several different methods. Non-limiting examples of such active mixer designs that may be used are illustrated in FIG. 2 and FIG. 3.

In one particular variation, the design of the coin-shaped reaction chamber is such that it is capable of containing or holding the volume of solvent and reagent necessary to elute 300 mCi of fluoride off the column. In addition, depending on the desired application and desired throughput, the width or cross-section of the channels may be increased significantly to facilitate or accelerate the flow and accordingly, increasing the processing throughput of the device.

For example, in one experiment employing a column and a reaction chamber of 10 µL in volume, the latter was filled with 400 to 500 mCi of [F-18] fluoride and was eluted by a 0.05M $K_2CO_3$ solution. Accordingly, the example demonstrate that it is possible to reduce the volume of the reaction chamber in order to accelerate the solvent exchange steps.

Solvent evaporation and dead-end filling require means to facilitate these processes to be accomplished in a practical period of time because in the microfluidic scale, the large (microliter) volume of the reaction chamber is capable of holding these relatively "large volumes." In one particular solution as described herein, a vent is placed above the reaction chamber consisting of a radiator that is separated from the reaction chamber. In one particular configuration, a vent configured above the reaction chamber comprises of a radiator that is sized with 250×250 micron channels that is separated from the reaction chamber by a 100 µm gas permeable membrane.

Application of a vacuum to this vent allows fast removal of gas from the reaction chamber when the latter needs to be filled with fluid. Also during evaporation, the process allows the removal of solvent vapors. As a result of this particular configuration, the evaporation process may be accelerated, and the process also reduces the vapor pressure allowing the removal solvents at lower temperatures. Reduction of the vapor pressure reduces some of the stress on the closed valves during the evaporation steps. In certain configuration, the vent may be configured with two or more open ends in order to permit the flushing of the vapors that may condense inside and allows the removal of the vapors out of the chip, for example, by applying a gas such as nitrogen gas.

While the configuration comprising a vent placed above the reaction chamber is one preferred arrangement, fabrication of the chip with the vent below the reaction chamber (as part of the control layer) may be more facile. It has been demonstrated that both arrangements of the vents above or below the reaction chamber are feasible. In addition, in certain experiments, we observed that dead-end filling rates were similar in both cases. However, solvent evaporation, while facilitated significantly by using both vent configurations, was found to be less efficient with the bottom vent location since, in this particular configuration, a significant amount of vapors condensed on the ceiling of the reaction chamber.

In one preferred embodiment of the device, double valves are used in the microfluidic chip. However, depending on the desired configuration and efficiency of the operation and the particular reaction employed, multiple valves, such as triple valves in series, may be employed. In addition, the combination of multiple valves; that is, employing pneumatic valves in combination with mechanical valves and other microfluidic valves used in the art, may be configured into the device. Such multiple valves combination may include, for (non-limiting) examples; three mechanical valves, two mechanical valves and one pneumatic valve, two pneumatic valves and one mechanical valves, etc . . . all combinations of which may be configured in different sequences.

In particular, it was observed that that even with the vacuum vent being applied in the process, bursts of high pressure may be generated inside the reaction chamber. It was observed that the burst of high pressures were of sufficient force to push the single valves open for a split second. In such an event, by employing double valves, if there is any back pressure behind the closed valve, such valve may close back down after being briefly opened without loss of pressure inside the reaction chamber. Alternatively, where there are significantly lower pressures generated behind a single valve, some liquid or solution may escape from the reaction chamber, which, in turn may further push or maintain the valve open. Accordingly, the back pressure behind the (first) valves surrounding the reaction chamber may be achieved by having a second set of valves placed at a short distance from the first set of valves.

In another embodiment of the microfluidic device of the present application, there is provided a microfluidic device comprising curved inlet and outlet channels for the effective elution of products, solutions and/or solvents from the reaction chamber. We have observed that when the eluent solution or solvent enters and leaves the chamber through channels that are configured to be substantially perpendicular to the tangent, a significant amount of the solution or product is left behind after the transfer of the solution. Alternatively, a thorough and efficient transfer of solutions or products invariably requires a significant amount of solvent to wash or elute the solution or product from the reaction chamber. However, we observed that by employing a configuration or design having curved inlet and outlet channels, the eluting solution follows a trajectory along the far wall of the reaction chamber and, accordingly, the configuration having curved inlet and outlet channels allows the collection or removal of product using significantly smaller volumes of solvents.

In certain embodiments, we determined that by designing the exit channel(s) slightly narrower than the inlet channel(s) allows the buildup of back pressure inside the chamber during the elution process, which result in an increase in the efficiency of product elution or collection from the reaction chamber.

In certain embodiments, we determined that a 6-channel manifold configuration for the introduction of various reagents, solvents and solution will allow the reagents, solvents and solution to enter the reaction chamber from 6 directions simultaneously and consequently, leads to faster and more efficient mixing, leading to shorter reaction and processing times.

In one particular aspect of the application, simultaneous introduction of liquid may be accomplished by having equal path lengths in the channel work from the origin of the manifold to each opening or inlet to the reaction chamber. In one variation, the process may also be facilitated by having one valve or a set of valves at the source or inlet to the manifold and a second set of valves at the entrances or inlets of the channels to the chamber. In this particular variation, the configuration allows the manifold to be filled first with the desired solvent or solution prior to releasing the solution or fluid into the reaction chamber.

3) Operation of the Chip: As noted above, the resulting chip design and configuration is significantly different from the known FDG chip. Accordingly, the reaction process flow and processing procedures require new methods of operation. For example, the mixing of solution and reagents in the reaction chamber require different methods and procedures since loop-based reactor designs are not feasible.

In one particular embodiment, the procedure for the FDG synthesis process employing the various configurations and elements for the microfluidic device of the present application may be illustrated in FIG. 1.

FIG. 1 shows a chip with a coin-shaped reactor. Valves are represented by red rectangles. All inlet/outlet channels are the same size except for the larger inlet for the water (product elution). The solution distributed through the manifold travels the same distance from the origin to the chamber through all 6 ports.

a) The dilute [F-18] solution is passed through the off-chip column and trapped by the resin off-chip. In one particular variation illustrated above, the process is controlled by on-chip valves on short channels connecting source of [F-18] to the column and the latter to the collection vial for $H_2^{18}O$.

b) The aqueous $K_2CO_3$ solution routed through the chip and controlled by on-chip valves is then passed through the off-chip ion exchange column to elute the [F-18] straight into the reactor on the chip.

c) Water may then be evaporated, leaving behind $K^{18}F$ and $K_2CO_3$ salts along with some residual moisture. The vacuum vent may be used in this and all subsequent evaporation steps. As a result of this procedure, the water vapor permanently leaves the chip rather than staying condensed in the chip's matrix.

d) In order to remove this moisture by forming an azeotrope with MeCN and solubilize $K^{18}F$ in organic solvents, the chamber may be filled with a solution, such as MeCN solution of Kryptofix222, followed by solvent evaporation.

e) Mannose triflate may be introduced into the reactor through the 6-port manifold. Actuating the mixer at an elevated temperature allows efficient fluorination. Alternatively, we have also demonstrated that fluorination may be achieved at ambient temperatures.

f) Upon completion of the fluorination reaction, the solvent may be partially removed by evaporation. If MeCN is evaporated completely, [F-18]FTAG forms a thick oily residue distributed unevenly throughout the reactor. This residue is very difficult to dissolve in an aqueous solution in the next step.

g) 3N HCl solution may be introduced to the half-empty reactor through one channel until the reactor is full. Efficient mixing with MeCN solution of [F-18]FTAG is achieved quickly since it is facilitated at the interface of two solutions by swirling resulting from $CO_2$ outgassing from an acid-base reaction (with $K_2CO_3$). Heating the reaction mixture at about 60° C. followed by a temperature of about 75° C. allows the hydrolysis to proceed to completion by gradual (but fast) removal of MeCN. This process results in an aqueous solution of [F-18]FDG.

h) In certain embodiments of the process, two methods for collecting the product from the reaction chamber after deprotection may be performed:

i. Flushing the product out through the tangential exit channel by introducing water into the reactor through another tangential channel allows the flow to follow the trajectory along the far wall of the chamber. Although 1-3 reactor volumes of water may be sufficient for complete collection of the product, currently, larger elution volumes are currently employed because of the extensive off-chip tubing that the product follows afterwards. In this particular configuration, this process has been experimentally proven to be the most efficient.

ii. In an alternative procedure, the reaction chamber may be drained in a two-step process. In the first step, closing off the exit from the radiator will send $N_2$ pressure into the reactor through the gas permeable membrane. This pressure will force the product out of the reaction chamber into the only open exit channel. If at the same time the mixer depicted in FIG. 3 is activated, the procedure will assist in directing the product solution into the exit channel and out of the reaction chamber, leaving behind droplets (or small residues, rather than regions) of product solution. In the second step, the reaction chamber is filled with water and force eluted under pressure as described above.

i) All the product-containing water may be passed through an off-chip purification cartridge similar to the one used in the large-scale synthesis (containing several parts trapping Kryptofix and fluoride and neutralizing HCl). Alternatively the product solution may be delivered to a vial containing 2M $KHCO_3$ solution to neutralize HCl. The contents of the vial are subsequently passed through an alumina column resulting in 99.3% radio-pure [F-18]FDG.

4) Mixers for the Large-Scale Reactor:

a) Mixing of the contents of the reaction chamber may be achieved by actuating the large flat round dead end channel below the reaction chamber at a certain frequency, as illustrated in FIG. 2. FIG. 2 shows a microscale reaction chamber with a bottom-up mixer.

Using this procedure and configuration, a number of issues and consideration may be addressed to form an efficient device:

i. Where the bottom vent location is employed, there is less space available in the control channel for the evaporation radiator.

ii. In the manufacture of the device, the membrane between the control channel and the reaction chamber may be unstable during the final curing of the chip because of large surface area/thickness ratio.

iii. Some product may remain behind in the reactor after final elution.

iv. The efficiency of the mixing by need to be optimized.

v. In order to wash the product out of the reactor, water may be required to be introduced at the side of the reactor opposing the exit line.

b) These above issues are effectively addressed by adding a dead-end serpentine channel to the control layer underneath the reaction chamber. Where the device configuration is manufacture to form place the vacuum vent at the bottom location, the configuration forms a "double radiator". The dead-end channel filled with oil may be used as a mixer, that may introduce waves in the reactor by pulsing the pressure applied to this channel. This configuration may also provide an additional mechanism for the removal of product from the reactor, in the case where the same waves oriented towards the exit channel actuating while building up pressure inside the reactor by applying $N_2$ to the vent instead of vacuum. As described above, the double radiator system is illustrated in FIG. 3. FIG. 3 shows a radiator mixer integrated with radiator evaporator.

c) The third type of mixing mechanism may also be devised, and such configuration requires no additional features. An analysis of the process for the preparation of FDG suggest that the step of mixing of two solutions is only required in the hydrolysis step. That is, in all other steps when a reagent solution is introduced into the reaction chamber, all other reagents are already distributed throughout the chamber in the solid form, and no significant mixing step is required.

Mixing of FTAG solution with HCl in this step may be "chemically promoted" by vigorous $CO_2$ generation from an acid-base reaction at the interface of two solutions. In this mixing step, the process produces significant agitation or swirling, which in turns, result in a rapid mixing of the two solutions. We have also demonstrated experimentally that in this step, the evaporation of the FTAG solution to dryness followed by HCl introduction leads to a the precipitation of solids, which may not be readily overcome by any type of active mixing.

d) In one particular aspect, the fourth mixing aide may be employed in conjunction with the self-stirring reaction in part (c), above. In one example, as the acetonitrile is evaporated from the FTAG solution in a closed reaction chamber, the coin-shape of the latter allows its flat surfaces to cave in as the volume of the solution is reduced. In this process, a vacuum is created inside the reaction chamber. When the valve(s) on the acid outlet channel is opened, the elastomeric surface restores its shape and volume of the chamber by rapidly withdrawing the acid inside the reaction chamber. The speed and rapid flow of the second solution into the reaction chamber promotes virtually instantaneous mixing of two or more solutions.

e) In another aspect, a different mixing mechanism utilizes the elastic properties of the material from which the chip is fabricated from. This mixing mechanism may be applied to reactions wherein the mixing of the solutions do not engage in a vigorous self-stirring reaction. In this particular process, the reaction chamber may be filled with one reagent of the reaction to about half volume of the chamber, and the subsequent introduction of the second reagent fills the remaining half empty space of the chamber.

Stirring or mixing of the solutions may be accomplished by a programmed pulsing of the pressure in the flow channel that is used to introduce the second reagent, with the valve on that channel remaining open. Under this process, the elastic chamber expands and elastically returns to it's original shape at the frequency of pulsing. In this pulsing mechanism, the contents of the chamber will be withdrawn from the reaction chamber and then returning back into the reaction chamber rapidly, under the frequency of the pulse, resulting in rapid and complete mixing. Once the desired mixing of the solution is completed, the valve(s) from the channel may be closed from the reaction chamber. We have demonstrated and validated this mixing methods successfully.

f) In another aspect of the mixing process, the manifold used for simultaneous introduction of a solution into the chamber from 6 directions may also be used for efficient and more passive mixing of the solutions with solids deposited in the reaction chamber.

ASPECTS OF THE INVENTION

In a first aspect, there is provided an automated, integrated microfluidic device comprising:
a chemical reaction chip comprising:
a substrate comprising a microfluidic a network of flow channels; and
a substantially coin-shaped reaction chamber comprising at least one inlet channel and one outlet channel wherein the reaction chamber is configured to be in fluid communication with at least one flow channel.

In a variation of the above device, the chip further comprises a manifold comprising multiport inlet channels and valves configured for controlling reagent and/or a solvent flow in fluid communication with the reaction chamber;
a pump operatively interconnected and in fluid communication with the flow channel for pumping fluids through the flow channel; and
the device further comprises a microscale column integrated with the chip and configured for liquid flow from the column to at least one flow channel, and wherein the fluid flow into the column is controlled by on-chip valves; and
at least two pneumatic valves for controlling fluid flow in the microfluidic device.

In one variation of the above device, the chamber is designed to be 250 μm in height with a diameter of at least 5 mm. In another variation, the chamber has a hold volume of at least 5 μL. In one particular variation of the device, the column is configured to be off-chip.

In one aspect, the column is designed for pre-packaging application and configured on a modular cartridge. Optionally, the off-chip column may be incorporated on a carrier module. As employed herein, the column may be an interchangeable or a disposable column that is configured for mounting on a modular cartridge. In certain aspect, the modular cartridge may be interchangeable or disposable.

In another aspect, there is provided the above device wherein at least one of the pneumatic valves comprises a set of double valves configured in series and wherein the double valves are configured to be in close proximity to each other.

In certain configurations of the chip design, the double valves are configured on all inlet and outlet channels that are in fluid communication with the reaction chamber. In certain designs of the device, the inlet and outlet channels are curvilinear to optimize liquid, reagents and product flow efficiency. The curved design of the inlet and outlet channels, as opposed to a substantially perpendicular in design, allows maximum flow of fluid and minimizes the amount of reagents or products that may remain in the chamber when eluted or washed with a fluid, such as a solvent. In most of the cases studied experimentally all channel orientations with obtuse or acute angles to the tangent resulted in more efficient elutions than a 90 degree orientation. In certain configurations, the inlet channels are configured to be wider than outlet channels to increase the flow efficiency out of the chamber. In certain configurations, the inlet channels are formed to be at least about 3%, preferably about 5%, or preferably about 10% or more wider than the outlet channels.

In a particular variation of the device, the device further comprises a vent comprising at least two open ends and configured to be adjacent to the reaction chamber for evaporation of solvent from the reaction chamber. In one variation, the vent is configured above the reaction chamber.

In another variation of the vent configuration, the vent may be fabricated in the chip to be configured below the chamber, and the vent may comprise part of the control layer of the chip. In particular designs, the chip may be fabricated to form vents that are above and also below the chamber.

In another particular variation of the device, the vent comprises a radiator of channels separated from the reaction chamber by a gas permeable membrane. In another variation, the device further comprises a vent used for vacuum evaporation of solvents across a gas-permeable membrane. In the above variation of the device, when the device is operated with a vacuum inside the vent allows rapid dead-end filling of liquids or solutions into the reaction chamber.

In a particular variation of the device, the vent is configured to provide a vacuum for carrying out solvent evaporations at pressures below the solvent vapor pressure to eliminate valve failure from overpressure. In another aspect of the device, the vent is configured with a vacuum inside the vent allowing highly efficient mixing by accelerating incoming fluid resulting from an increased pressure differential between the reaction chamber and its exterior. It is noted that the increased in the efficiencies resulting from the above vent configuration and operation provides significant operational efficiencies in the process.

In yet another aspect of the above device, the device further comprises two or more channel inlets to the reaction chamber at angles other than about 90 degrees resulting in increased efficiency of product removal or elution from the reaction chamber.

The gas permeable membrane is made of a material that is permeable to gases and at the same time, substantially impermeable to liquids. In the present application of the membrane, the membrane is substantially impermeable to a liquid but is permeable to the gas of the same liquid. In addition, the material is substantially inert to the reagents, solvents, reactants and reaction temperatures used in the process; that is, it does not engage in reactions with these agents, nor does it react with or decompose in the presence of the radioactive materials.

In yet another variation of the above described device, the vent comprises at least two open ends for removing vapors from the chip. In a variation of the above, the vent is configured below the reaction chamber. In another variation, the vent comprises a radiator having multiple channels and are separated from the reaction chamber by a gas-permeable membrane.

In one particular aspect, the radiator comprises of 250×250 micron channels that are separated from the chamber by a 100 μm gas-permeable membrane.

In another variation of the device, the manifold comprises at least 6-port inlet channels connected to the reaction chamber. In certain variation of the device, the manifold comprises at least 2, 3, 4, 5, 6 or more port inlet channels connected to the reaction chamber. In yet another variation, the length of the channels extending from the manifold to each of the port opening into the chamber is substantially equal.

In certain configuration, the multi-port inlet channels allows the simultaneous introduction of reagents or solution into the chamber that result in faster mixing with higher efficiency, allowing reactions to proceed and provide shorter overall reaction times. In certain configurations of the chip, there is provided a valve or a set of valves at the source of the manifold and a second valve or set of double valves near the inlet port to the chamber. In this particular configuration, reagents and/or solvents may be introduced to fill the manifold before the reagents and/or solvents are released into the reaction chamber.

In a particular variation of the above device, the device is approximately 20×20×4 mm in size. In another variation, the device is approximately 25×25×5 mm. In addition, the device may further comprise a flat dead end control channel configured with the reaction chamber for mixing the contents of the reaction chamber. In one variation of the above, the dead end channel forms a bottom-up mixer configured with the reaction chamber. In another variation, the device further comprises a dead-end serpentine channel to the control channel configured under the reaction chamber for mixing the content of the reaction chamber. In yet another variation, the device further comprises a dead-end serpentine channel under the reaction chamber, and configured together with the vent to form a double radiator for mixing the contents of the reaction chamber.

In another embodiment, there is provided an automated, integrated microfluidic device for performing chemical reactions and for processing of reaction products, the device comprising:

a chemical reaction chip comprising:
  a substrate comprising a microfluidic a network of flow channels for moving reagents, solvents and products through the chip;
  a substantially coin-shaped reaction chamber for introducing reagents and solvents for performing the chemical reaction, the chamber comprising at least one inlet channel configured to be in fluid communication with at least one flow channel for introducing reagents and solvents into the chamber, and at least one outlet channel for transferring a solution comprising reagent and product from the chamber;
  a manifold comprising multiport inlet channels and valves, configured for controlling reagent and/or a solvent flow, in fluid communication with the reaction chamber;
  a pump operatively interconnected and in fluid communication with the flow channel for pumping reagents, solvents and products through the flow channel and chip;
  a microscale chromatography column for isolating or purifying reagents used for performing the chemical reaction, wherein the column is integrated with the chip and configured with column inlet channels and outlet channels for fluid flow to introduce reagents and/or solvents into the column and from the column to at least one flow channel to the reaction chamber, and wherein the liquid flow into the column is controlled by on-chip valves; and
  at least two on-chip valves for controlling reagents, solvents and products flow among the column, the flow channels, the manifold, and the reaction chamber in the microfluidic device.

In one variation of the above device, the chemical reaction forms radiopharmaceutical compounds labeled with any medically useful radioactive element, such as Chromium-51, Copper-64, Iodine-131, Iridium-192, Molybdenum-99, Phosphorus-32, Samarium-153, Technetium-99, Yttrium-90, Gallium-67, Iodine-123, Thallium-201, Carbon-11, Nitrogen-13, Oxygen-15 and Fluorine-18.

In one variation of the above device, the chemical reaction forms 18F-labeled radiopharmaceutical compounds. In another variation, the 18F-labeled compounds is selected from the group consisting of 2-deoxy-2-[F-18]fluoro-D-glucose ([F-18]-FDG), 3'-deoxy-3'-[F-18]-fluorothymidine ([F-18]-FLT), 2-deoxy-2-[F-18]fluoro-D-glucose ([F-18]-FDG), 3'-deoxy-3'-[F-18]-fluorothymidine ([F-18]-FLT), 9-(4-[18F]fluoro-3-(hydroxymethyl)butyl)guanine ([18F]-FHBG) and 2-(1-{6-[(2-[18F]fluoroethyl)(methyl)amino]-2-naphthyl}ethylidine)malononitrile ([18F]-FDDNP).

In one particular aspect of the above device, the chromatography column is a resin column for trapping [F-18]F— from a solution of target water containing F-18 fluoride ions (to increase the concentration of F-18 fluoride ions in the subsequent reaction mixture). In another variation, the column is configured to trap at least 100 microCi of F-18 fluoride.

In one particular embodiment, the column is configured to trap at least 150 microCi; preferably at least 250 microCi, more preferably at least 100 milliCi, at least 200 milliCi, or at least 300 milliCi of F-18 fluoride ions. In one particular experiment, such column trapped 870 mCi of F-18.

In yet another variation of the above device, the column is configured to be off-chip. In a particular variation of the above, a triflate precursor compound is contacted with a F-18 fluoride solution in the reaction chamber to form a F-18 fluoride derivative. In another aspect of the above device, the reaction chamber is configured to hold a sufficient volume of solvent to elute about 300 mCI of [F-18] fluoride off the column and into the reaction chamber.

In another variation of the above device, the device is configured for preparing at least 5 doses of the radiopharmaceutical compound from a single 5-minute process cycle. In another variation, the column inlet and outlet channels for supplying the eluent water into the reaction chamber are at least 5% wider than the other channels in the device. In yet another variation, the manifold comprises at least 6-port inlet channels connected to the reaction chamber. In a particular variation, the length of the channels extending from the manifold to each of the port opening into the chamber is substantially equal.

In another variation of the above device, the device is configured for preparing at least 3 to 20 doses of the radiopharmaceutical compound from a single process cycle ranging from 3 to 20 minutes.

In one particular configuration, the device is approximately 20×20×4 mm in size.

In one aspect of the above device, the device further comprises a flat dead end control channel configured with the reaction chamber for mixing the contents of the reaction chamber. In a particular variation of the above device, the device further comprises a dead-end serpentine channel under the reaction chamber, and configured together with the vent to form a double radiator for mixing the contents of the reaction chamber.

In one aspect of the present invention, a shielding or casing which is impermeable to radioactivity emanating from the positron and gamma-emitters employed in the above device encloses the device. Such a casing can be of any material which will sufficiently block the radiation, such as lead, tungsten, or compounds and amalgams of these and other elements.

REFERENCES

1) Multistep Synthesis of a Radiolabeled Imaging Probe Using Integrated Microfluidics. Hsian-Rong Tseng, et. al. Science, 2005, 310, 1793-1796.
2) A Nanoliter Rotary Device for Polymerase Chain Reaction. Liu, J.; Enzelberger, M.; Quake, S. Electrophoresis, 2002, 23, 1531-1536.
3) From Micro to Nanofabrication with Soft Materials. Quake, S.; Scherer, A. Science, 2000, 290, 1536-1540.
4) Monolithic Microfabricated Valves and Pumps by Multilayer Soft Lithography. Unger, M. A.; Chou, H.-P.; Thorsen, T.; Scherer, A.; Quake, S. R. Science, 2000, 288, 113-116.

5) Gas Sorption, Diffusion, and Permeation in Poly(dimethylsiloxane). Merkel, T. C.; Bondar, V. I.; Nagai, K.; Freeman, B. D.; Pinnau, I. J. Polym. Sci., Part B: Polymer Physics, 2000, 38, 415-434.
6) Rapid Prototyping of microfluidic Systems in Poly(dimethylsiloxane). Duffy, D. C.; McDonald, J. C.; Schueller, O. J. A.; Whitesides, G. M. Anal. Chem. 1998, 70, 4974-4984.
7) A Microfluidic Device for Conducting Gas-Liquid-Solid Hydrogenation Reactions. Kobayashi, J.; Mori, Y.; Okamoto, K.; Akiyama, R.; Ueno, M.; Kitamori, T.; Kobayashi, S. Science, 2004, 304, 1305-1308.
8) Size-Controlled Growth of CdSe Nanocrystals in Microfluidic Reactors. Chan, E. M.; Mathies, R. A.; Alivisatos, A. P. Nano Lett. 2003, 3, 199-201.
9) Method for Fabrication of Microfluidic Systems in Glass. Stjernström, M.; Roeraade, J. J. Micromech. Microeng. 1998, 8, 33-38.
10) Extraction of [$^{18}$F]Fluoride from [$^{18}$O]Water by a Fast Fibrous Anion Exchange Resin. Jewett, D. M.; Toorongian, S. A.; Bachelor, M. A.; Kilbourn, M. R. Appl. Radiot. Isot. 1990, 41, 583-586.

Although the present invention has been described in detail with reference to specific embodiments and aspects and variations, one skilled in the art will recognize that modifications and improvements are within the scope and spirit of the invention, as set forth in the claims below.

All publications and patent documents cited herein are incorporated herein by reference as if each such publication or document was specifically indicated to be incorporated herein by reference. Citation of publications and patent documents is not intended as an admission that any such document is pertinent prior art, nor does it constitute any admission as to the contents or date of the same. The invention having now been described by way of written description and example, one skilled in the art will recognize that the invention can be practiced in a variety of embodiments and variations thereof, and that the above description and examples are for purposes of illustration and not limitation of the following claims.

What is claimed is:

1. A microfluidic device for performing chemical reactions, the device comprising:
a microfluidic chip comprising:
i) a reaction chamber;
ii) at least one substantially flat channel located below the reaction chamber to control fluid flow through the reaction chamber;
iii) a network of one or more inlet flow channels and one or more outlet flow channels, wherein each inlet flow channel and each outlet flow channel is equipped with at least two on-chip valves for controlling the fluid flow of reagents, solvents and reaction products to and from the reaction chamber; and
iv) a vent adjacent to the reaction chamber, wherein the vent comprises at least one radiator channel having a winding shape and being separated from the reaction chamber by a gas permeable membrane, the membrane and the radiator channels being above the reaction chamber.

2. The device of claim 1 wherein the reaction products include radiolabeled products.

3. The device of claim 1, wherein the vent adjacent to the reaction chamber is connected to a vacuum source for vacuum evaporation of solvents across the gas-permeable membrane.

4. The device of claim 3, wherein the chip further comprises a double radiator for mixing contents of the reaction chamber, the double radiator comprising a radiator mixer integrated with a radiator evaporator.

5. The device of claim 4, further comprising:
a microfluidic network of substrate flow channels arranged for moving reagents, solvents and products through the chip,
wherein the at least two on-chip valves are configured for controlling the flow of reagents, solvents and reaction products and back pressure,
wherein each set of the on-chip valves can be a combination of mechanical and/or pneumatic valves.

6. The device of claim 5, wherein the at least two on-chip valves control the fluid flow into an ion-exchange column and out of the ion-exchange column.

7. The device of claim 6, wherein the vent adjacent to the reaction chamber is used for dead-end filling of liquids into the reaction chamber.

8. The device of claim 1, wherein the reaction chamber is closed during at least one process step of a chemical reaction.

9. The device of claim 1, wherein the reaction chamber is elastic and is adapted to expand from its original shape.

10. The device of claim 1, wherein when a valve of an outlet flow channel is closed, the reaction chamber has a volume within a range from about 1 microliter to about 10 microliters.

11. The device of claim 1, wherein the reaction chamber is a batch reaction chamber.

12. The device of claim 1, wherein the reaction chamber is a coin-shaped reactor chamber.

13. The device of claim 6, wherein the vacuum source is applied to the vent to facilitate removal of gas from the reaction chamber.

14. A microfluidic chip comprising:
a reaction chamber;
at least one substantially flat channel located below the reaction chamber to control fluid flow through the reaction chamber;
a network of one or more inlet flow channels and one or more outlet flow channels equipped with associated valves, the associated valves being configured for controlling the flow of reagents, solvents and reaction products to and from the reaction chamber; and
a vent adjacent to the reaction chamber, wherein the vent comprises a radiator of channels having a winding shape and being separated from the reaction chamber by a gas permeable membrane, the membrane and the radiator channels being above the reaction chamber.

15. The microfluidic chip of claim 14, wherein the reaction chamber is elastic and is adapted to change from its original shape.

16. The microfluidic chip of claim 14, wherein the reaction chamber is a batch reaction chamber.

17. The microfluidic chip of claim 14, wherein the reaction chamber is a coin-shaped reactor chamber.

18. The microfluidic chip of claim 14, further comprising:
a vacuum source that is applied to the vent to facilitate removal of gas from the reaction chamber.

* * * * *

UNITED STATES PATENT AND TRADEMARK OFFICE
CERTIFICATE OF CORRECTION

PATENT NO. : 8,658,112 B2
APPLICATION NO. : 13/286418
DATED : February 25, 2014
INVENTOR(S) : Arkadij M. Elizarov et al.

It is certified that error appears in the above-identified patent and that said Letters Patent is hereby corrected as shown below:

In the Specification

Column 1, line 15, please insert the following paragraph before the title "FIELD OF THE INVENTION"
--This invention was made with government support under Grant No. CA119347 awarded by the National Cancer Institute. The government has certain rights in the invention.--

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,658,112 B2 | Page 1 of 1 |
| APPLICATION NO. | : 13/286418 | |
| DATED | : February 25, 2014 | |
| INVENTOR(S) | : Arkadij M. Elizarov et al. | |

It is certified that error appears in the above-identified patent and that said Letters Patent is hereby corrected as shown below:

In the Specification

Column 1, line 15, please insert the following paragraph before the title "FIELD OF THE INVENTION"

-- This invention was made with government support under Grant No. CA119347 awarded by the National Cancer Institute and under Grant No. DE-FC02-02ER63420 awarded by the Department of Energy. The government has certain rights in the invention. --

This certificate supersedes the Certificate of Correction issued May 13, 2014.

Signed and Sealed this
Seventh Day of October, 2014

Michelle K. Lee
*Deputy Director of the United States Patent and Trademark Office*